United States Patent Office 3,184,403
Patented May 18, 1965

3,184,403
TWO-SECTION CATALYST BED
Lloyd E. Gardner and Robert J. Hogan, Bartlesville, Okla., assignors to Phillips Petroleum Company, a corporation of Delaware
No Drawing. Filed Sept. 12, 1960, Ser. No. 55,128
1 Claim. (Cl. 208—89)

This invention relates to a two-stage treatment of heavy hydrocarbon liquid such as a heavy residual hydrocarbon oil. In one of its aspects, the invention relates to a process of hydrotreating a heavy residual hydrocarbon stock in the presence of a sulfur-resistant hydrodesulfurization catalyst and subsequently treating the thus-treated stock under hydrocracking conditions over a catalyst consisting essentially of cobalt molybdate on fluorinated alumina. In another of its aspects, the invention relates to the treatment under hydrocracking conditions of at least a portion of a heavy residual hydrocarbon stock in the presence of a cobalt molybdate on fluorinated alumina when said stock has been treated under hydrotreating conditions in the presence of a sulfur-resistant hydrosulfurization catalyst. In another aspect of the invention, Wafra topped crude having an initial boiling point of 400° F. is hydrocracked following a hydrotreatment thereof in presence of a hydrotreatment catalyst. In a further aspect, the invention first hydrotreats a Wafra topped crude and then effectively hydrocracks the same in the presence of a hydrocracking catalyst, as herein described. In a further aspect of the invention it relates to a composited catalyst bed containing a layer of a cobalt molybdate on alumina catalyst and a layer of HF-treated cobalt molybdate on alumina catalyst.

We have now discovered that a cobalt molybdate-fluorine-alumina catalyst is particularly suited to hydrocracking a residual stock which has been first hydrotreated in a preliminary stage.

It is an object of this invention to provide a two-stage treatment of a heavy hydrocarbon liquid. It is another object of this invention to provide a pre-treatment which renders hydrocracking of a residual stock in the presence of a cobalt molybdate-fluorine-alumina catalyst more effective. It is a further object of this invention, specifically, to provide a process in which Wafra topped crude can be effectively hydrocracked. A still further object of the invention is to provide a novel combination of catalysts especially suited to the two-stage treatment of a heavy hydrocarbon liquid.

Other aspects, objects and several advantages of this invention are apparent from this description and the appended claims.

According to the present invention, a heavy residual hydrocarbon stock, such as Wafra topped crude, for example, boiling at about 400° F. and higher, is first hydrotreated over a sulfur-resistant hydrodesulfurization catalyst, e.g., cobalt molybdate on alumina and is subsequently hydrocracked over a catalyst of cobalt molybdate on fluorinated alumina. It is a concept basic to the present invention that the cobalt molybdate on fluorinated alumina appears to be particularly well suited to the hydrocracking step after the preliminary treatment in presence of a sulfur-resistant hydrodesulfurization catalyst. Also, according to the invention there is provided a novel catalyst combination comprising a layer of a cobalt molybdate on alumina catalyst and a layer of an HF-treated cobalt molybdate on alumina catalyst.

Although a large variety of residual hydrocarbon stocks are suited to conversion by the present process, presently preferred to be treated are crude oil residues such as topped crude, atmospheric and vacuum-reduced crudes, and the like. However, the process is applied with very good results to those residual stocks which have substantial carbon residue values from crudes such as asphalt-base and mixed-base crudes. Particularly, the process now finds excellent suitability to the beneficiation or conversion of Wafra topped crudes.

In the following example, the data show results obtained.

EXAMPLE

The tests below compare the present invention (dual bed tests) with tests of each of the same catalysts alone. The tests were continuous flow in a down-flow, fixed bed reactor. The dual-bed runs were made with a catalyst of cobalt molybdate on alumina in the upper half of the bed, and cobalt molybdate on HF-treated alumina in the lower half of the catalyst bed.

The carbon residue referred to in the data are Ramsbottom values.

*Table I.—Hydrocracking Wafra topped crude*

[1000 p.s.i.g., 125 cc. catalyst, 6 hr. runs]

| | CoMo bed | Dual bed | CoMo bed | HF-CoMo bed | Dual bed | CoMo bed | HF-CoMo bed | Dual bed |
|---|---|---|---|---|---|---|---|---|
| Run Number | 1 | 2 | 3 | 4 | 5 | 6 | 7 | 8 |
| Average temperature, °F | 726 | 725 | 726 | 725 | 726 | 750 | 748 | 751 |
| LHSV | 0.22 | 0.26 | 0.51 | 0.50 | 0.48 | 0.49 | 0.51 | 0.49 |
| Percent conv. of 850° F.+ | 61 | 83 | 36 | 53 | 59 | 42 | 62 | 70 |
| Percent desulfurization | 95 | 98 | 92 | 86 | 97 | 96 | 85 | 98 |
| Percent carbon res. removal | 94 | 99 | 77 | 75 | 88 | 93 | 79 | 94 |
| Product inspection, $C_5$+: | | | | | | | | |
| °API 60/60 | 31.5 | 38.0 | 28.1 | 29.7 | 31.5 | 30.1 | 31.4 | 35.4 |
| Wt. percent sulfur | 0.18 | 0.06 | 0.31 | 0.52 | 0.13 | 0.14 | 0.54 | 0.09 |
| Wt. percent C res | 0.67 | 0.13 | 1.9 | 2.1 | 0.96 | 0.60 | 1.7 | 0.48 |
| Yields, wt. percent of charge: | | | | | | | | |
| $C_1C_4$'s | 0.2 | 10.8 | 2.3 | 7.4 | 7.8 | 3.9 | 9.5 | 7.5 |
| $C_5$'s–400° F | 12.2 | 24.8 | 5.4 | 10.8 | 9.8 | 9.0 | 16.1 | 18.5 |
| 400–850° F | 61.2 | 48.8 | 53.0 | 50.8 | 55.3 | 52.0 | 48.1 | 52.9 |
| 850° F,+ | 21.4 | 9.4 | 35.4 | 26.8 | 22.8 | 31.7 | 21.9 | 16.5 |
| Coke | 1.6 | 2.6 | 0.7 | 1.1 | 0.8 | 0.8 | 1.3 | 1.0 |
| Sulfur as $H_2S$ | 3.4 | 3.6 | 3.3 | 3.1 | 3.5 | 3.5 | 3.1 | 3.6 |

Wafra 400° F.+ crude properties:
 ° API 60/60—18.6
 Wt. percent sulfur—3.6
 Wt. percent C res.—8.1
 Wt. percent 850° F.+—57.0

Catalyst properties:
 $CoMoO_4$-$Al_2O_3$—2.5% Co, 6.1% Mo, 180 m.²/g.
 HF-$CoMoO_4$-$Al_2O_3$—2.6% Co, 4.9% Mo, 5.5% F, 180 m.²/g.

The cobalt molybdate on alumina catalyst was prepared by (1) impregnation of alumina with aqueous ammonium molybdate, (2) heating, (3) impregnation with aqueous cobalt nitrate and (4) heating.

The fluorinated catalyst was prepared by soaking 184 parts by weight of the above catalyst in 127.4 parts of 12.3 weight percent aqueous hydrofluoric acid followed by drying.

These catalysts had been used several times prior to making the above tests.

Referring to Table I, in Run 2, the dual bed of the invention doubles the gasoline boiling range from 12.2 of Run 1, to 24.8 over the use of the cobalt molybdate bed. The dual bed in the next three runs (Runs 3, 4 and 5) yields 55.3 of the useful 400–850° F. material which is higher than the single bed of either of the other two catalysts of Runs 3 and 4 of the table, while materially reducing the 850° F.+ material which is not as desirable. Similarly, for the last three runs (6, 7 and 8) of the table in which there is a notable increase in the gasoline boiling range material.

As can be seen from an examination of the test results, the cobalt molybdate-fluorine-alumina catalyst is particularly suited to hydrocracking a residual stock which has been hydrotreated in a preliminary stage. This is evident when a combination of cobalt molybdate on alumina followed by cobalt molybdate-fluorine-alumina is superior to the same total quantity of either catalyst alone. In tests at several conditions, the combination of two catalysts gave better desulfurization, carbon residue reduction and conversion of 850° F.+ than either catalyst alone.

Generally, the sulfur resistant hydrotreating catalysts useful in the first stage of this invention are the supported oxides and sulfides of Groups VI and VIII metals, particularly chromium, molybdenum, tungsten, cobalt and nickel. Suitable supports or carriers are the activated clays such as montmorillonite and bauxite, and synthetic gels such as activated alumina, silica-alumina, zirconia, titania, etc. Particularly good catalysts are cobalt molybdate on alumina and nickel-tungsten sulfide on alumina. These catalysts and methods of preparing them are well known in the prior art.

The fluorinated cobalt molybdate catalyst can be made in several ways, but one simple and quite satisfactory method is simply soaking an alumina-supported cobalt molybdate catalyst in aqueous hydrofluoric acid, draining the catalyst and drying it by heating. Satisfactory fluorine contents are in the range of 1 to 10 weight percent. Alternatively, the catalyst can be made by treatment of the alumina either as a wet or dried gel with hydrofluoric acid or ammonium fluoride; and the dried and treated gel subsequently impregnated by spraying with cobalt nitrate and ammonium molybdate solutions. The final catalyst will ordinarily contain from 1 to 5 weight percent cobalt and from 2 to 10 weight percent molybdenum, although operable catalysts can be obtained with amounts outside these ranges.

It will be noted from the example that the fixed bed reactor contains a layer of cobalt molybdate on alumina in the upper half of the bed and cobalt molybdate on HF treated alumina in the lower half of the bed and that the two layers are thus contiguous.

Conventional pressures, temperatures, flow rates and hydrogen rates can be used. Temperatures will ordinarily range from 650° F. to 850° F., although temperatures above 800° F. are used in the second stage only at high flow rates. Pressures can range from 500 to 5000 p.s.i. Liquid hydrocarbon flow rates of 0.2 to 10 volumes an hour are satisfactory, but rates of 0.5 to 4 volumes an hour are preferred. Hydrogen flows of 500 to 5000 cubic feet per barrel are ordinarily employed.

Reasonable variation and modification are possible within the scope of the foregoing disclosure and the appended claims to the invention, the essence of which is that an HF-cobalt molybdate on alumina catalyst has been found to effectively combine with a sulfur-resistant hydrodesulfurization catalyst which is used in a first stage to hydrotreat a heavy residual hydrocarbon stock, especially a Wafra topped crude.

We claim:

A catalytic bed especially suited for the hydrotreatment and hydrocracking of a heavy residual hydrocarbon stock which comprises a layer of cobalt molybdate on alumina catalyst and a layer contiguous therewith of HF-treated cobalt molybdate on alumina catalyst.

References Cited by the Examiner

UNITED STATES PATENTS

| | | | |
|---|---|---|---|
| 2,839,450 | 6/58 | Oettinger | 208—110 |
| 2,911,352 | 11/59 | Goretta et al. | 208—68 |
| 2,925,374 | 2/60 | Gwin et al. | 208—89 |
| 2,945,803 | 7/60 | Beuther et al. | 208—89 |
| 2,987,468 | 6/61 | Chervenak | 208—216 |
| 3,003,953 | 10/61 | Evans | 208—210 |
| 3,008,895 | 11/61 | Hansford et al. | 208—89 |
| 3,023,158 | 2/62 | Watkins | 208—89 |

ALPHONSO D. SULLIVAN, *Primary Examiner.*